United States Patent [19]

Inman

[11] Patent Number: 4,489,889
[45] Date of Patent: Dec. 25, 1984

[54] EXTENDIBLE NOZZLE EXIT CONE

[75] Inventor: Frank S. Inman, Brigham City, Utah

[73] Assignee: Thiokol Corporation, Chicago, Ill.

[21] Appl. No.: 439,706

[22] Filed: Nov. 8, 1982

[51] Int. Cl.³ .............................................. B64D 33/04
[52] U.S. Cl. .................................. 239/265.33; 60/271
[58] Field of Search ..................... 239/265.33; 60/271, 60/242

[56] References Cited

U.S. PATENT DOCUMENTS

| | | | |
|---|---|---|---|
| 2,683,961 | 7/1954 | Britton et al. | 239/265.33 |
| 2,703,959 | 3/1955 | Wetherbee, Jr. | 239/265.33 |
| 3,183,664 | 5/1965 | Divone | 239/265.33 |
| 3,637,042 | 1/1972 | Raynes | 239/265.33 |
| 4,169,555 | 10/1979 | Crowe | 239/265.33 |
| 4,213,566 | 7/1980 | Miltenberger | 60/271 |
| 4,383,407 | 5/1983 | Inman | 239/265.33 |
| 4,387,564 | 6/1983 | Carey | 60/242 |

*Primary Examiner*—Andres Kashnikow
*Assistant Examiner*—Michael J. Forman
*Attorney, Agent, or Firm*—Gerald K. White

[57] ABSTRACT

A normally collapsed but extendible nozzle exit cone for the second or upper stage of a missile having a first or lower stage includes three concentrically disposed linear segments each of which is a hollow, truncated cone larger than the adjacent upstream segment. The mechanism for translating the segments from their collapsed or stowed state to their deployed state includes a plurality of pneumatic cylinders, each of which contains a gas generant charge, and a set of folding linkages associated with each pneumatic cylinder that are attached to the movable segments of the exit cone. The segments of the exit cone are provided at their ends with locking shoulders and one shoulder of each pair includes an elastomeric seal so that gas tight seals are provided between the segments, as they are aligned. An over-center action of each of the folding linkages locks the extended exit cone adjacent thrust forces of the nozzle.

11 Claims, 13 Drawing Figures

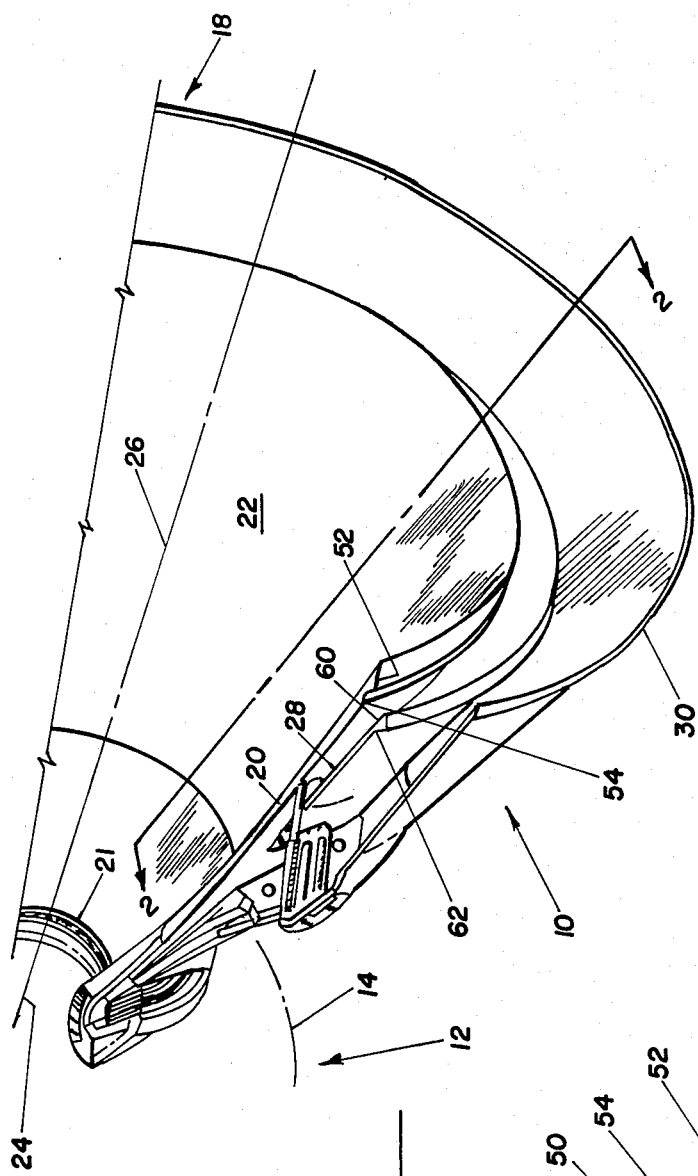
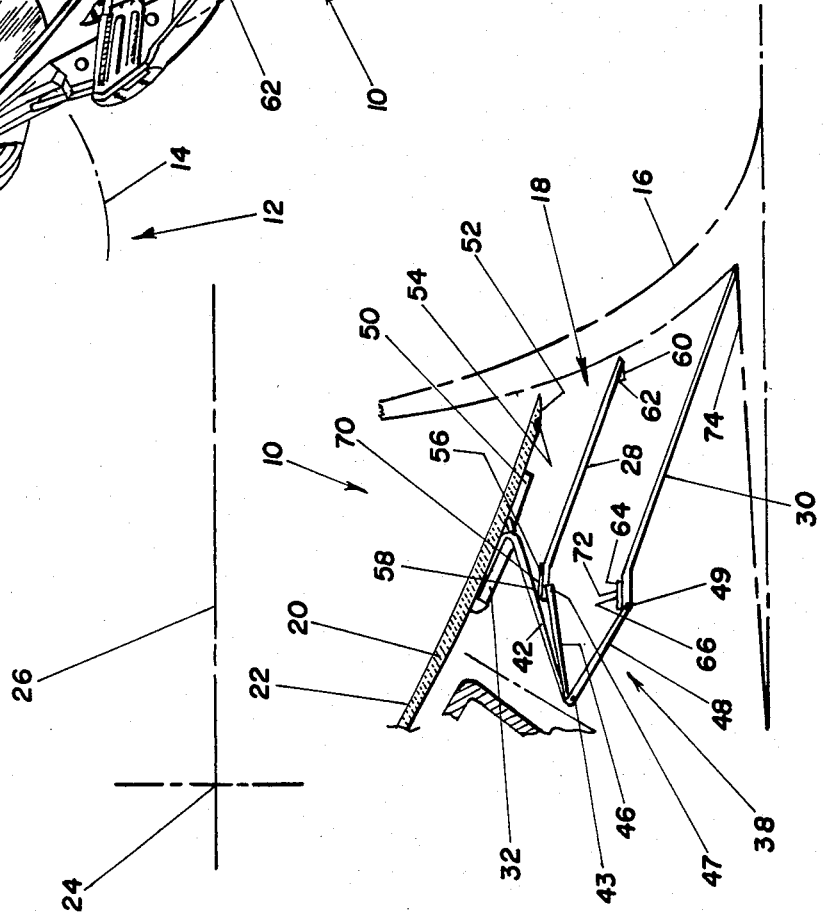
Fig. 1
Fig. 2

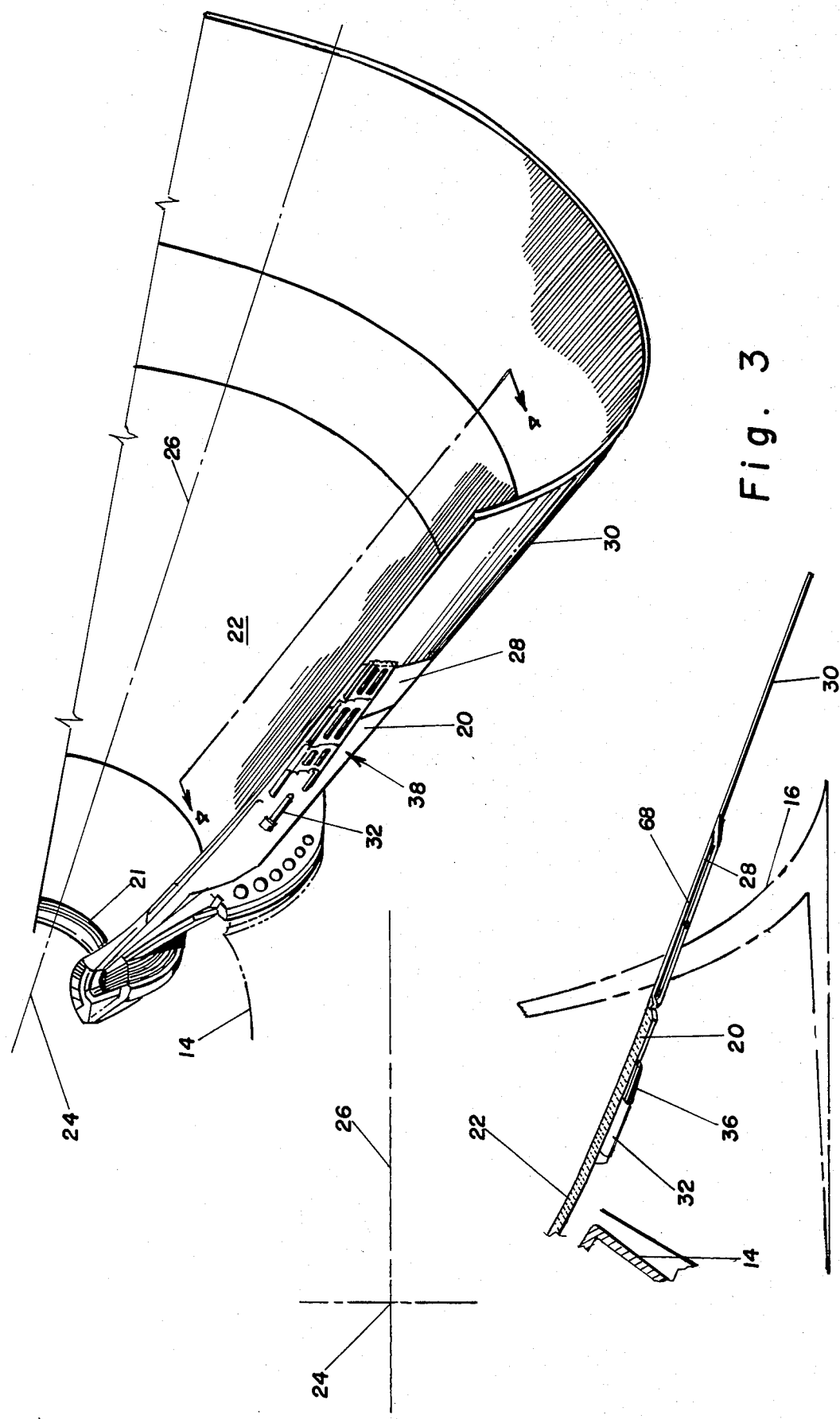

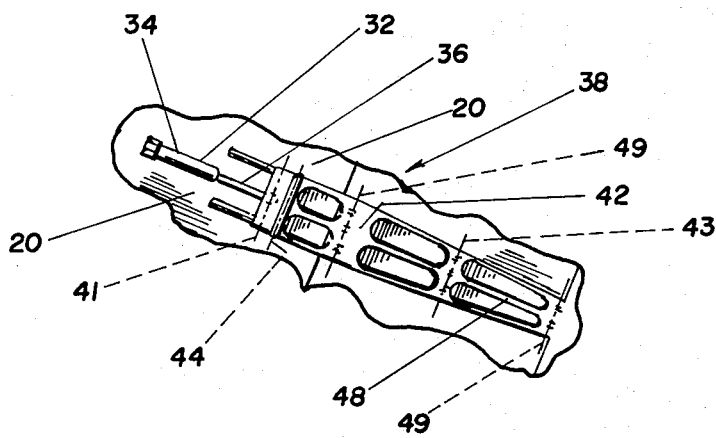
Fig. 5
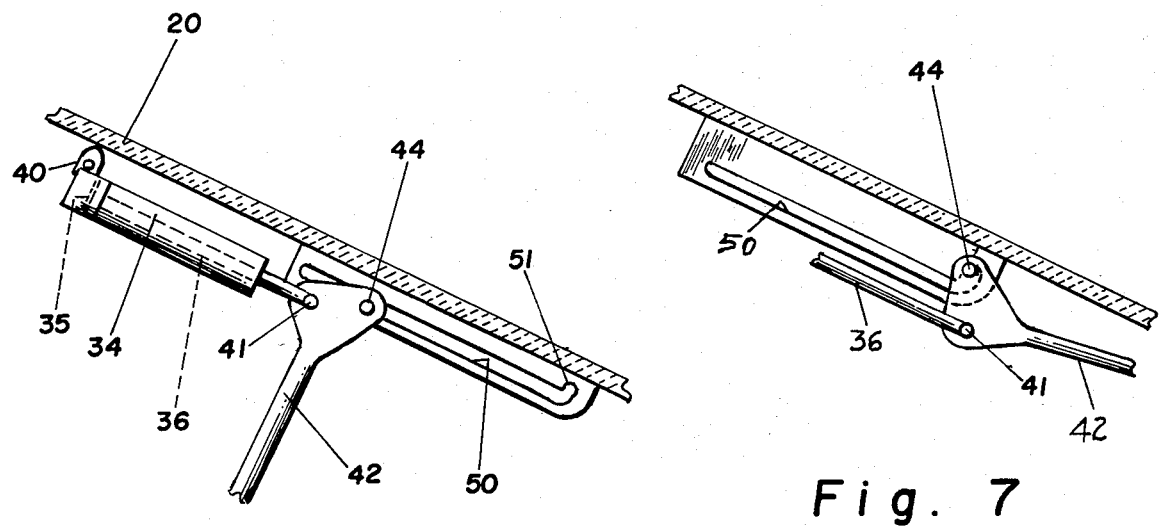
Fig. 6
Fig. 7
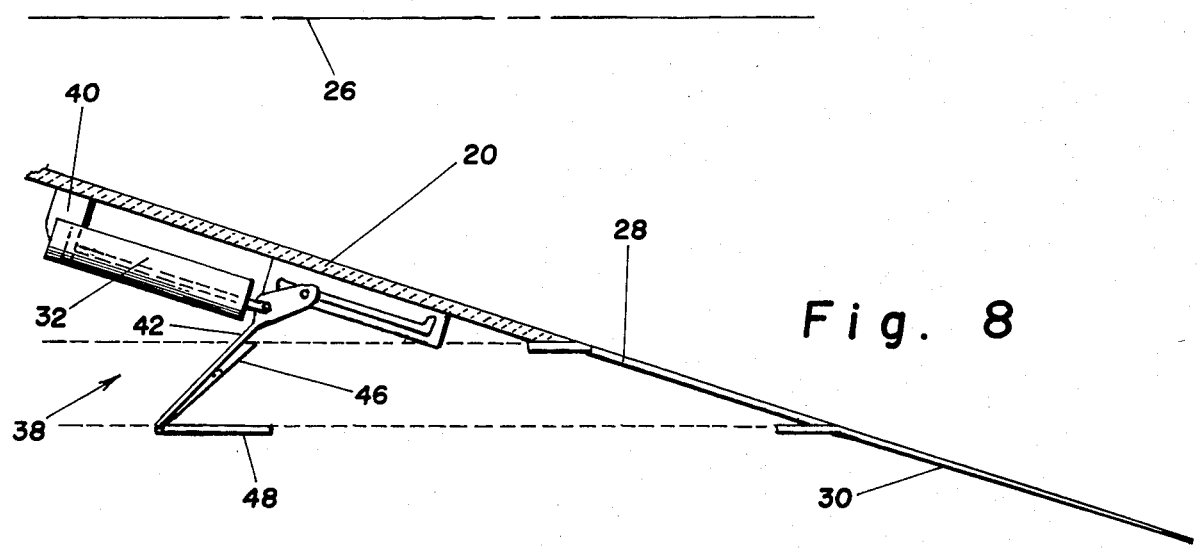
Fig. 8

EXTENDIBLE NOZZLE EXIT CONE

BACKGROUND OF THE INVENTION

1. Field of the Invention

This invention relates to an improvement in an extendible nozzle exit cone for rocket motors.

2. Description of the Prior Art

Deep space ballistic missile systems or satellite probes require high performance, low weight, and highly packageable primary propulsion systems. Excluding propellant tanks, the largest component of the propulsion system is the rocket engine exhaust nozzle. The rocket nozzle takes up a large amount of valuable space relative to its mass.

The exit cone for a conventional nozzle for rocket motors is designed for optimum performance at the median altitude of the intended trajectory. One of the functions of the exit cone is to provide an inclined surface against which the expanding exhaust plume of the rocket can bear, thereby to provide some of the forward thrust of the rocket. The exhaust plume grows larger with increasing altitude of the rocket because of the lower pressures of the ambient atmosphere at the higher altitudes. At low altitudes, the exhaust plume is too small for the available surface of the exit cone. As as result, a partial vacuum tends to form on the inside edges of the exit cone, thereby creating an atmospheric drag on the rocket. At high altitudes, the exhaust plume is too large for the exit cone so that much of the potential energy is unused. A rocket motor nozzle that is sufficiently large to make full use of the expanding exhaust gases of a rocket engine in the low ambient pressures at high altitudes would normally occupy an inordinately large proportion of the available storage space in silos, submarines, and between stages of a plural-stage missile.

Thus, there is a need and a demand not only for a rocket motor nozzle exit cone that is capable of providing uniformly high performance over the entire range of the intended trajectory but which also adequately meets the expansion ratios required for high altitude rocket flight while still remaining within length limiting constraints.

Various proposals have been made in the prior art to provide a large expansion ratio nozzle that can be stowed in a collapsed or nested configuration and thereby made to fit in a minimal storage space, and that can be extended to a configuration suitable for high altitude operation after motor ignition and lift off. These have included the use of: (a) a rocket nozzle exit cone extension that is flexible and can be expanded or compressed in various ways as by convoluting, as disclosed in U.S. Pat. No. 3,346,186 to D. L. Fulton et al, U.S. Pat. No. 3,358,933 to J. H. Altseimer, U.S. Pat. No. 3,711,027 to L. F. Carey, and U.S. Pat. No. 3,784,109 to J. W. Dueringer, and in copending application for U.S. Patent bearing Ser. No. 338,713, filed Jan. 11, 1982 by Frank S. Inman and Joseph E. Pelham; (b) an inflatable and convoluted fabric rocket nozzle exit cone extension as disclosed in U.S. Pat. No. 3,596,465 to T. O. Paine et al; and (c) a rocket nozzle exit cone extension that is segmented longitudinally as disclosed in a paper entitled "Nested Extendible Exit Cone Solid Rocket Nozzle Engineering Evaluation Program" presented at the AIAA/SAE 14th Joint Propulsion Conference, Las Vegas, Nevada, July 25-27, 1978, and as disclosed in copending application for U.S. Pat. bearing Ser. No. 230,939, filed on Feb. 2, 1981 by Frank S. Inman; said last mentioned copending application and that mentioned hereinbefore being assigned to the assignee of the present invention.

The present invention is concerned particularly with that form of extendible rocket nozzle exit cone which is segmented longitudinally, and is characterized by its provisions for the automatic translation and deployment, upon command, of the exit cone segments, with a positive drive force, with the system locked against thrust forces of the nozzle, and gas tight seals provided between the segments, as they are aligned in extended position. The invention is further characterized in that less stowage volume is needed for the collapsed and stowed exit cone than for convoluted or folded exit cones.

SUMMARY OF THE INVENTION

An object of the invention is to provide an improvement in translating mechanism for automatically deploying the normally collapsed or nested nozzle segments of an extendible rocket nozzle exit cone.

A further object of the invention is to provide such an improved mechanism comprising a plurality of sets of pneumatic cylinder operated folded linkages that are attached to the movable segments of the exit cone.

Another object of the invention is to provide such an improved mechanism including a plurality of pneumatic cylinders the source of power for each of which is a gas generant charge therein, a pneumatic cylinder being individually associated with each set of folding linkages.

Still another object of the invention is to provide such an improved mechanism wherein the sets of folding linkages lock the movable segments in the deployment position against thrust forces of the nozzle.

A further object of the invention is to provide such an improved mechanism wherein the movable segments are provided at their ends with locking shoulders, one of each pair having a seal whereby gas tight seals are provided between the segments, as they are aligned.

In accomplishing these and other objectives of the invention, there is provided a collapsible or nested exit cone for a rocket nozzle that is comprised of three linear segments each of which is a hollow, truncated cone larger than the adjacent upstream or forward segment. The segments may either be stowed in a collapsed position wherein the successive segments surround each other, or they may be deployed to their extended positions, wherein they are successively aligned to form a single cone.

The translating mechanism for deploying the extendible exit cone comprises a plurality of pneumatic cylinders. Each cylinder operates an associated one of a plurality of folding linkages that are attached to the movable segments of the exit cone. Each cylinder is attached at one end to the stationary cone segment that is fixed to the rocket motor. At its other end, each cylinder is pivoted to a lever at an intermediate position along the length thereof. The lever has a cam follower on one end, and is attached in a pivoted manner at its other end to one end of each of two links which, for convenience, are designated "first" and "second" links. The cam follower rides in a slotted cam that is also fixed to the stationary cone segment and serves to guide the segments of the linkages. The other end of the first link is pivoted to the intermediate cone segment, and the other end of the second link is pivoted to the outer cone segment.

Each pneumatic cylinder contains a gas generant charge that is ignited when deployment of the exit cone to its extended position is desired. When this happens, the lever is extended downstream or rearward. The geometry of each of the folding linkages is such that the first link is extended forwardly, and the second link is extended rearwardly to fit the movable cone segments together.

The segments of the exit cone are equipped at their ends with locking shoulders, one shoulder of each pair of segments having an elastomeric seal whereby gas tight seals are provided between the segments, as they are aligned.

Throughout the entire travel time, the piston of each pneumatic cylinder supplies a positive drive force for deployment of the extendible nozzle exit cone. After completion of each piston stroke, the associated lever moves over center to lock the extended nozzle exit cone segments against thrust forces of the rocket motor exhaust gases.

BRIEF DESCRIPTION OF THE DRAWINGS

Having summarized the invention, a detailed description follows with reference being had to the accompanying drawings which form part of the specification, of which:

FIG. 1 is a partial longitudinal pictorial representation of the extendible nozzle exit cone according to the invention illustrating the movable nozzle segments in the collapsed or stowed positions thereof;

FIG. 2 is a partial longitudinal section of the extendible nozzle exit cone taken along the lines 2—2 of FIG. 1;

FIG. 3 is a pictorial representation similar to FIG. 1 but shows the extendible nozzle exit cone in the fully extended or deployed position;

FIG. 4 is a partial longitudinal section of the extendible nozzle exit cone taken along the lines 4—4 of FIG. 3;

FIG. 5 is a fragmentary view of the exterior surface of FIG. 3 and shows the translating mechanism in the fully actuated position thereof;

FIGS. 6 and 7 are enlargements of portions of the sectional views of FIGS. 2 and 4, respectively, and show details of the translating mechanism;

FIGS. 8 through 12 are views illustrating different successive positions assumed by linkage members of the translating mechanism as the extendible nozzle exit cone is deployed.

DESCRIPTION OF THE PREFERRED EMBODIMENT

Figure 9:
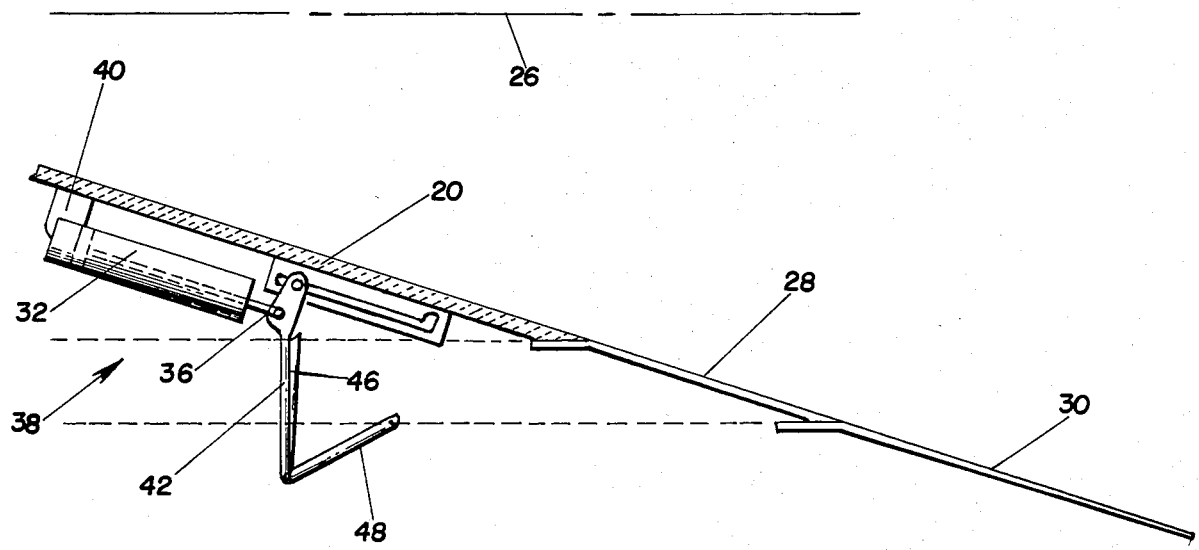
Figure 10:
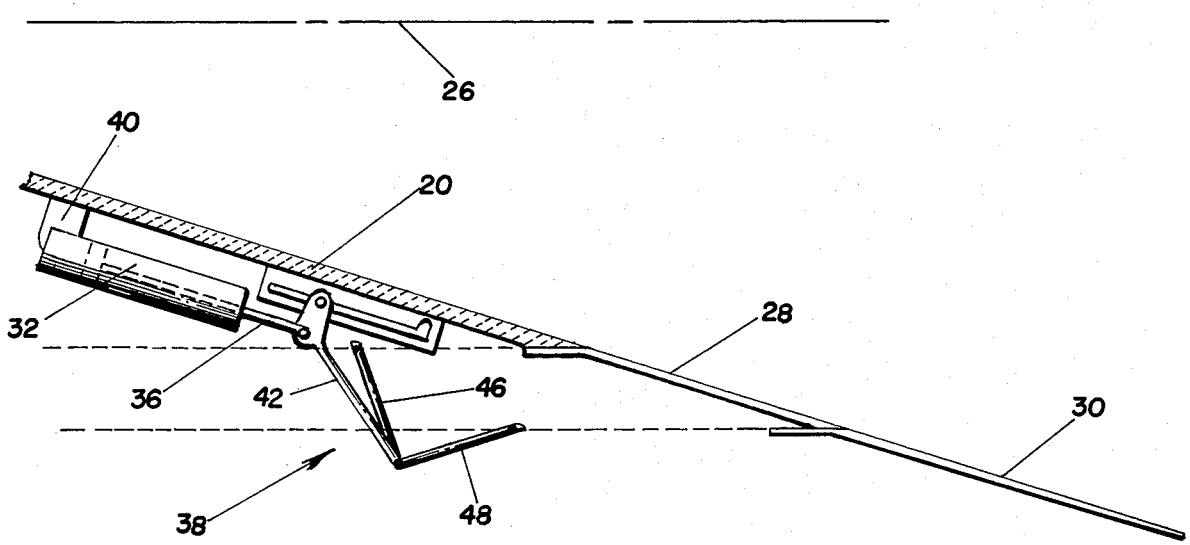
Figure 11:
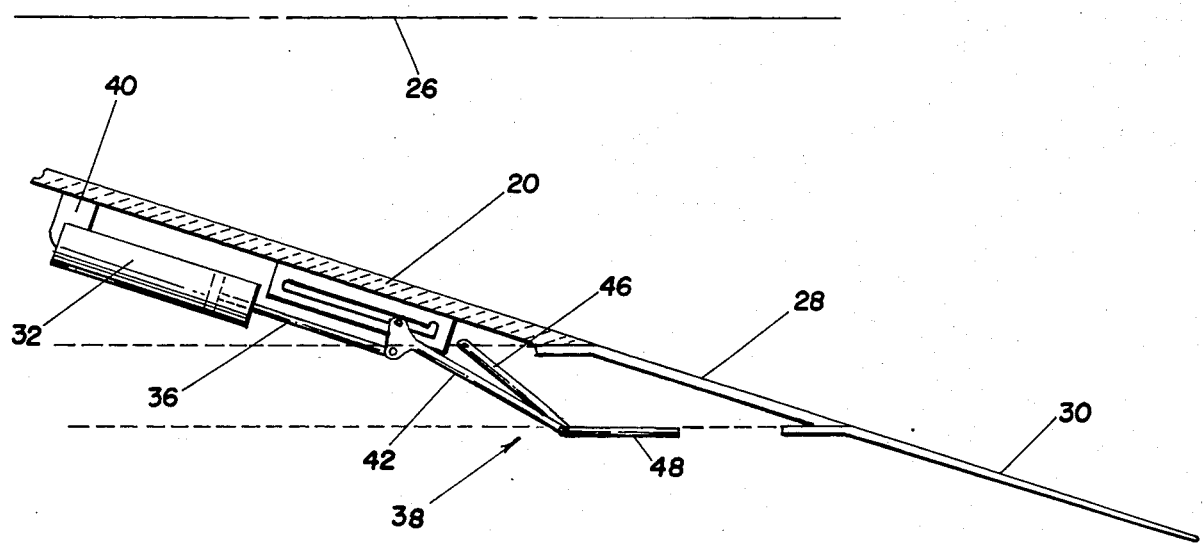

There is illustrated in the partial longitudinal pictorial representation of FIG. 1 and section view of FIG. 2 the aft portion 10 of a cylindrical rocket motor indicated at 12. The rocket motor 12 includes a case 14 and may comprise, for example, the second or upper stage of a missile having a first or lower stage the forward dome portion of which is indicated in phantom in FIG. 2 by a dot and dash line 16.

The aft portion 10 of rocket motor 12 includes a thrust nozzle comprising an extendible nozzle exit cone indicated at 18 that is divided into segments longitudinally. The first or forward segment is a typical longitudinal thrust nozzle 20 of the conventional convergent-divergent type having a venturi throat 21, and an interior exit cone surface 22. Nozzle segment 20 is pivoted for rotation on a pivot indicated at 24 that is disposed on the longitudinal center line 26 thereof. The only departure from the conventional thrust nozzle is that nozzle segment 20 is designed for optimum performance at sea level, rather than for the median altitude for the entire trajectory of the missile. The nozzle segment 20, accordingly, is somewhat smaller than the conventional nozzle for a given rocket. Nozzle segment 20 is fixedly attachable to the case 14 of a rocket motor 12 by means not shown but known to those skilled in the art.

The extendible nozzle exit cone 18 is made of three linear segments the forward segment of which, as noted, comprises the segment 20 that is attached to the rocket motor case 14, and hence, is relatively stationary. Each of the three segments has a divergent conic interior surface. With the exit cone 18 in the collapsed state as illustrated in FIGS. 1 and 2, segment 20 alone is in position to be effective for generating thrust forces for sustaining rocket flight upon separation of the missile lower stage from the upper stage rocket motor 12 and firing of the latter. The other two segments of the extendible nozzle exit cone are designated by reference numbers 28 and 30, segment 28 being aft of stationary nozzle segment 20 but forward of segment 30 when exit cone 18 is deployed to its extended state, as illustrated in FIGS. 3 and 4. Each of the segments 20, 28 and 30 comprises a hollow, truncated cone that is larger than the adjacent upstream, or inboard, segment. The segments 20, 28 and 30 may either be stowed in a collapsed state wherein the successive segments are concentrically disposed, as illustrated in FIGS. 1 and 2, or they may be deployed to their extended positions wherein they are successively aligned to form the single extended exit cone 18, as shown in FIGS. 3 and 4.

The translating mechanism for the deployment of the extendible nozzle exit cone 18 from its collapsed state to its extended state includes a plurality of pneumatic cylinders, only one of which, designated 32, is illustrated in each of FIGS. 2 and 4. Desirably, however, a pneumatic cylinder 32 may be employed in each quadrant of the extendible nozzle exit cone 18, spaced at equal intervals thereabout. Each pneumatic cylinder includes a relatively stationary body portion 34 and a rod 36 that extends longitudinally from one end of the body portion 34, the rod 36 being attached to a movable piston, not shown, within the body portion 34. Each pneumatic cylinder further includes a gas generant charge 35, as indicated in FIG. 6 for actuating the piston and thereby forceably extending rod 36 from the body portion 34. Typically, the gas generant charge may be a charge such as that disclosed in U.S. Pat. No. 4,203,787 to G. F. Kirchoff and F. E. Schneiter entitled "Pelletizable Rapid And Cool Burning Nitrogen Gas Generant," and in U.S. Pat. No. 4,296,084 to G. V. Adams and F. E. Schneiter entitled "Method Of And Apparatus For Gas Generation." It is noted that, while not so illustrated in the drawing, each pneumatic cylinder 32 may be of the telescoping variety as disclosed in the aforementioned U.S. Pat. No. 3,346,186 to D. F. Fulton et al, if desired.

Each of the pneumatic cylinders 32 operates an individually associated set of folding linkages as indicated generally by the reference numeral 38 in the drawings. FIG. 2 shows an edge view of linkage 38 in its collapsed state. FIG. 5 shows a plan view of linkage 38 in its extended state. Each set of linkages 38 is attached to the movable nozzle segments 28 and 30 of the extendible nozzle exit cone 18. As illustrated in FIGS. 5, 6 and 8–12, the body portion 34 of each pneumatic cylinder 32 is pivotally attached at one end as by a bracket 40 to the outer surface of the stationary exit cone segment 20. At its other end, that is, at the end of rod 36 remote from body portion 34, each pneumatic cylinder 32 is intermediately connected by a pivot 41 to a lever 42 of the associated set of folding linkages 38.

Lever 42 has a cam follower 44 on one end and, as best seen in FIG. 2, is attached pivotally at its other end 43 to one end of each of two links, specifically, a first link 46 and a second link 48. As shown in FIGS. 6 and 7, the cam follower 44 rides in a slotted cam 50 having an inwardly curved portion 51 at the downstream end thereof. Slotted cam 50 is fixed to the exterior surface of the stationary cone segment 20 and serves to guide the movement of the set of linkages 38 during the translation of the nozzle exit cone 18 from its collapsed state, as shown in FIGS. 1 and 2 to its extended state as shown in FIGS. 3 and 4. The other end of first link 46 is pivoted at 47 to the forward or upstream end of the intermediate nozzle cone segment 28, and the other end of second link 48 is pivoted at 49 to the forward end of the outer nozzle cone segment 30. Suitable tabs may be provided, if desired, at the upstream ends of the nozzle cone segments 28 and 30 to accommodate the respective pivots 47 and 49. Successive positions assumed by lever 42, first link 46 and second link 48 as the extendible nozzle exit cone is deployed to its fully extended position are illustrated in FIGS. 8–12.

Each pneumatic cylinder 32, as mentioned hereinbefore, contains a gas generant charge 35 that, upon command, is ignited when deployment of the extendible nozzle exit cone 18 is desired. Upon such ignition and pneumatic cylinder actuation, the lever 42 is extended aft or rearwardly, being rotated in a counterclockwise direction about a sliding pivot provided by the cam follower 44 sliding in slotted cam 50. The geometries of the set of folding linkage 38 and the movable cone segments 28 and 30 are such that the first link 46 is extended forwardly, being rotated counterclockwise, and the second link 48 is extended rearwardly, as shown by FIGS. 8–12, thereby to fit the nozzle exit cone segments 20, 28 and 30, together in a single extended nozzle exit cone 18.

By reference to FIG. 2, it is seen that in the collapsed position of the extendible nozzle exit cone 18, there is an angle less than 180° between the first link 46 and nozzle segment 28, exteriorly of segment 28. Accordingly, upon counterclockwise rotation of lever 42, a substantially corresponding counterclockwise rotational moment is given link 46. For a portion of this rotation, lever 42 may be substantially aligned with lever 46, as seen in FIGS. 8 and 9. Upon completion of the stroke of the rod 36 of the pneumatic cylinder 32, and movement of segment 28 to its fully extended or deployed position, the end of first link 46 that is pivoted to segment 28 will be disposed forwardly of the other end of link 46, the end thereof that is pivoted to the end 43 of lever 42.

The angular relationship, an angle of at least or more than 180° exteriorly of second link 48 with respect to nozzle segment 30, permits only a relatively small rotational movement of link 48 as the link 48 is rotated about each of its ends, as is evident upon a comparison of FIGS. 2 and 8–12. Hence, upon actuation of pneumatic cylinder 32, the link 48 is extended rearwardly with but relatively little angular movement.

The linkage members 42, 46 and 48 of each set of folding linkages 38, shown in edge view only in each of FIGS. 2, 4 and 8–12, desirably may be in the form of hinged clevis support brackets as illustrated in the plan view thereof shown in FIG. 5. Also, as shown in FIG. 5, the cam follower 44 at the end of lever 42 may be in the form of an elongated rod, the width of the slotted cam 50 being such as to accommodate such an elongated cam follower.

In accordance with the invention, the segments 20, 28 and 30 of the extendible nozzle exit cone 18 are equipped at their ends with locking shoulders with one of each pair of shoulders holding an elastomeric seal whereby gas tight seals are provided between the segments 20 and 28 and between the segments 28 and 30, as the several segments are deployed to their extended, fully deployed positions and are aligned.

Figure 13:
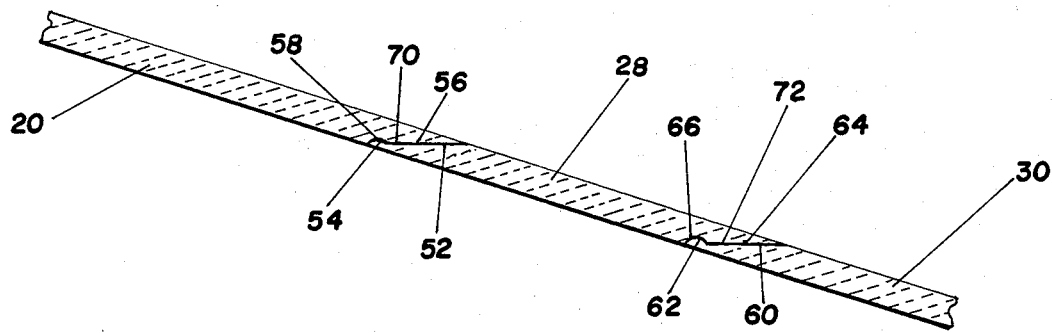
FIG. 13 is an enlargement of a portion of the sectional view of FIG. 4 and shows the interlocking shoulders of the extendible exit cone segments.

Specifically, as best seen in FIGS. 2 and 13, nozzle exit cone segment 20 is provided at its aft circular end with an annular shoulder 52, an annular recess 54 being provided on the exterior surface of segment 20 adjoining the shoulder 52. Similarly, exit cone segment 28 is provided at the forward or upstream circular end thereof with an annular shoulder 56 and an adjoining annular ridge 58 at the extreme upstream end thereof. Upon deployment of segment 28 to its extended state, shoulder 56 thereof engages shoulder 52 of segment 20 and ridge 58 locks in place in recess 54.

The aft end of nozzle exit cone 28 is provided with an annular shoulder 60 and with an annular recess 62 adjoining the shoulder 50 at the exterior surface thereof. Exit cone segment 30 is provided at its upstream end with an annular shoulder 64 and an adjoining annular ridge 66 at the extreme upstream end thereof. When nozzle segment 30 is deployed to its extended state, shoulder 64 thereof engages shoulder 60 on the end of nozzle segment 28 and ridge 66 locks in place in recess 62.

The geometry of the cooperating shoulders 52 and 56 of the respective nozzle segments 20 and 28 and of the cooperating shoulders 60 and 64 of the respective segments 28 and 30 is such that when the segments are locked in aligned position, the extended exit cone provides a single linear exit cone surface 68 for rocket motor 12, as shown in FIG. 2.

For providing a gas tight seal between shoulders 52 and 56 of segments 20 and 28, respectively, an elastomeric seal 70 may be provided on the surface of shoulder 56 of segment 28, as indicated in FIG. 13. Similarly, for providing a gas tight seal between the shoulders 60 and 64 of the respective segments 28 and 30, an elastomeric seal 72 may be provided on the surface of shoulder 64.

Figure 12:
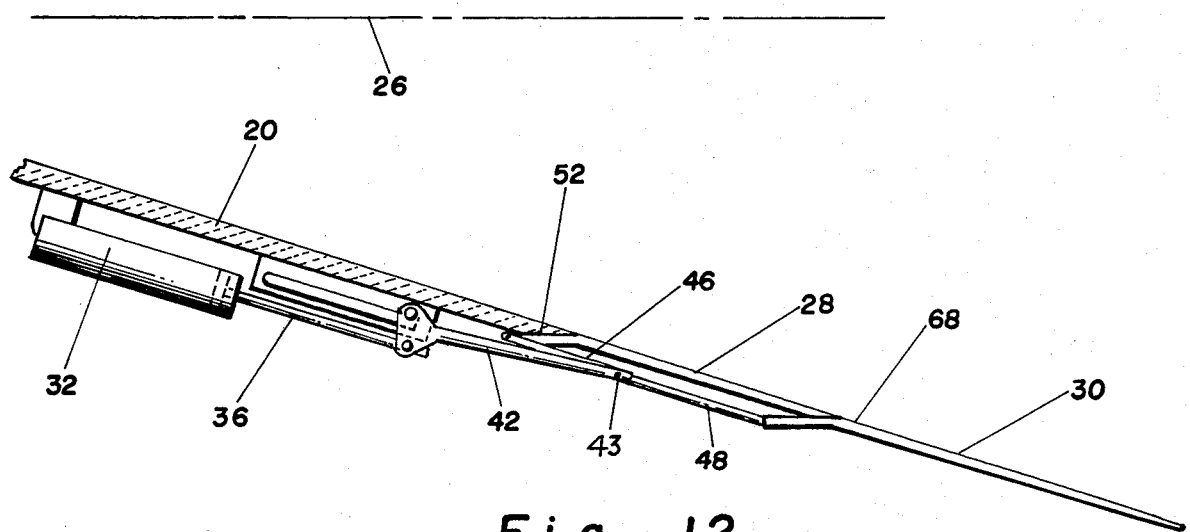

As shown in FIG. 12, the geometry of each folding linkage set 38 is such that, after completion of the piston stroke of each of the pneumatic cylinders 32, the pivotal connection of the links 46 and 48 with the end 43 and the lever 42 moves "over center". This action results from the curvature 51, as shown in FIG. 6, in the cam surface 50 and locks the folding linkage system to hold the extended nozzle segments 28 and 30 in place against thrust forces on the single nozzle exit conical surface 68.

It is noted that throughout the entire travel or translation time of the translating mechanism in deploying the nozzle exit cone 18 from its stowed or collapsed state to its extended state, each of the pneumatic cylinders 32 provides a positive drive force for deployment.

It is also noted that less stowage volume for the collapsed nozzle exit cone 18 is needed than in convoluted or cloth folded cones. The stowage volume required is indicated by the dot and dash line which has been identified by the reference character 16 in FIG. 2 of the drawings. It is seen that the collapsed nozzle exit cone fits nicely within the space provided between stages of a plural-stage missile.

Thus, there has been provided, according to the invention, an extendible nozzle exit cone for a rocket nozzle that normally is in a collapsed or nested state requiring minimal stowage volume and that is comprised of three concentrically disposed linear segments 20, 28 and 30, each of which is a hollow, truncated cone larger than the adjacent upstream segment. When deployed to their extended positions, the segments 20, 28 and 30 are successively aligned to form a single exit cone 18 having a single nozzle exit conical surface 68.

The translating mechanism for deploying the nozzle cone segments to their extended positions comprises a plurality of pneumatic cylinders 32 and associated sets of folding linkages 38. The nozzle segments 20, 28 and 30 are characterized in their provision of cooperating locking shoulders and gas tight seals between pairs of shoulders whereby gas tight seals are provided between the segments as they are aligned. The pneumatic cylinder and folding linkage system is further characterized in moving to an over center position upon completion of the pneumatic cylinder piston stroke whereby the extended nozzle segments are locked against the thrust force of the nozzle.

The materials of which the nozzle segments 20, 28 and 30 and the sets of folding linkages 38 are made may be in accord with the known practice in the art. For example, the extendible exit cone 18, when deployed with rocket motor 12 ignited, radiates at high temperatures at 4000° F. and higher, and accordingly, the nozzle segments 20, 28 and 30 and the hinged clevis support brackets for the sets of linkages 38 desirably are made of carbon/carbon, a refractory or other suitable material that will withstand such high temperature.

What is claimed is:

1. An extendible nozzle exit cone for a rocket motor comprising,
    a plurality of concentric nozzle segments, the inner one of said segments being attachable to a rocket motor case, at least one outer segment being movable from a nested position to an extended fully deployed position, each of said segments having a divergent conic inner surface, which surfaces form a single substantially conic surface when said outer segment is in its fully deployed position,
    folding linkage means for deploying said outer segment from the nested position to the extended, fully deployed position, said folding linkage means comprising a lever having a cam follower at one end, a slotted cam in which said cam follower is disposed in cooperative relation, and a first link,
    said first link having one end pivotally attached to said outer segment and the other end attached to the other end of said lever, and
    actuatable translating means having a first end and a second end the distance between which is extended upon actuation thereof,
    said translating means having a pivotal connection at said first end to said inner segment, and being intermediately pivoted at said second end to said lever.

2. An extendible nozzle exit cone for a rocket motor as specified in claim 1 wherein said actuatable translating means comprises a pneumatic cylinder containing a gas generant charge.

3. An extendible nozzle exit cone for a rocket motor as specified in claim 2 further including a bracket attached to the exterior surface of said inner segment, and
    wherein said pneumatic cylinder includes a body that is attached to said bracket and a movable rod extending from said body, the end of said rod remote from said body being intermediately pivoted to said lever.

4. An extendible nozzle exit cone for a rocket motor as specified in claim 1
    wherein said plurality of concentric nozzle segments includes two outer segments,
    wherein said folding linkage means further includes a second link, said second link having one end pivotally attached to the outer one of said outer segments and the other end attached to the said other end of said lever,
    wherein the angle between said second link and the outer one of said outer segments on the side facing away from said exit cone is at least 180°, and
    wherein the angle between said second link and the inner one of said outer segments on the side facing away from said exit cone is less than 180°.

5. An extendible nozzle exit cone for a rocket motor as specified in claim 4
    wherein said actuatable translating means comprises a pneumatic cylinder containing a gas generant charge and having a body and a movable rod extending from said body, and
    further including a bracket attached to the exterior surface of said inner segment,
    said body of said pneumatic cylinder being attached to said bracket, and
    the end of said rod remote from said body of said pneumatic cylinder being intermediately pivoted to said lever.

6. An extendible nozzle exit cone for a rocket motor as specified in claim 4 wherein said inner and outer nozzle segments are provided at their ends with locking shoulders, said locking shoulders including an annular exterior shoulder and adjoining annular recess on the aft end of an upstream segment and an annular interior shoulder and adjoining annular ridge on the forward end of an adjacent downstream segment, said annular shoulders engaging with said annular ridge fitting into said annular recess to lock said adjacent segments together.

7. An extendible nozzle exit cone for a rocket motor as specified in claim 6 wherein at least one of each pair of shoulders is provided with an elastomeric seal whereby gas tight seals are provided between said segments when said segments are fully deployed in their extended positions.

8. An extendible nozzle exit cone for a rocket motor as specified in claim 6
    wherein said inner nozzle segment includes at the end thereof an annular shoulder and an adjoining recess,
    wherein each of said outer nozzle segments includes a shoulder and an adjoining ridge at the end thereof that is attached to a link, and includes at the other end thereof a shoulder and an adjoining recess, said shoulder and ridge of the intermediate segment cooperating in locking manner with the shoulder and recess of said inner segment, and said shoulder and ridge of the outer segment cooperating in locking manner with the shoulder and recess of the intermediate segment.

9. An extendible nozzle exit cone for a rocket motor comprising, a plurality of concentric nozzle segments including an inner segment and two outer segments, the inner segment being attachable to a rocket motor case, each of the outer segments being movable from a nested position to an extended fully deployed position, each of said inner and outer segments having a divergent conic inner surface, which surfaces form a single substantially conic surface when each of said outer segments are in their fully deployed positions, folding linkage means for deploying said outer segments from the nested position to the extended, fully deployed position, said folding linkage means comprising a lever having a cam follower at one end, a slotted cam in which said cam follower is disposed in cooperative relation, and a first link, said first link having one end pivotally attached to the inner one of said outer segments and the other end attached to the other end of said lever, said folding linkage means further including a second link, said second link having one end pivotally attached to the outer one of said outer segments and the other end attached to the said other end of said lever, the angle between said second link and the outer one of said outer segments on the side facing away from said exit cone being at least 180°, the angle between said second link and the inner one of said outer segments on the side facing away from said exit cone being less than 180°, said folding linkage means being adjusted into an over center configuration in the fully deployed and extended positions of said outer segments whereby said folding linkage means locks said outer segments against thrust forces of the nozzle, and actuatable translating means having a first end and a second end the distance between which is extended upon actuation thereof, said translating means having a pivotal connection at said first end to said inner segment, and being intermediately pivoted at said second end to said lever.

10. An extendible nozzle exit cone for a rocket motor comprising,

A plurality of concentric nozzle segments including an inner segment and two outer segments, the inner segment being attachable to a rocket motor case, each of the outer segments being movable from a nested position to an extended fully deployed position, each of said inner and outer segments having a divergent conic inner surface, which surfaces form a single substantially conic surface when each of said outer segments are in their extended fully deployed positions, folding linkage means for deploying each of said outer segments from the nested position to the extended fully deployed position, said folding linkage means comprising a lever having a cam follower at one end, a slotted cam in which said cam follower is disposed in cooperative relation, and a first link, said first link having one end pivotally attached to the inner one of said outer segments and the other end attached to the other end of said lever, said folding linkage means further including a second link, said second link having one end pivotally attached to the outer one of said outer segments and the other end attached to the said other end of said lever, the angle between said second link and the outer one of said outer segments on the side facing away from said exit cone being at least 180°, the angle between said second link and the inner one of said outer segments on the side facing away from said exit cone being less than 180°, said inner and outer nozzle segments being provided at their ends with locking shoulders, said inner nozzle segment including at the end thereof an annular shoulder and an adjoining recess, each of said outer nozzle segments including a shoulder and an adjoining ridge at the end thereof that is attached to a link, and including at the other end thereof a shoulder and an adjoining recess, said shoulder and ridge of the intermediate segment cooperating in locking manner with the shoulder and recess of said inner segment, and said shoulder and ridge of the outer segment cooperating in locking manner with the shoulder and recess of the intermediate segment, and actuatable translating means having a first end and a second end the distance between which is extended upon actuation thereof, said actuatable translating means having a pivotal connection at said first end to said inner segment, and being intermediately pivoted at said second end to said lever, said actuatable translating means comprising a pneumatic cylinder containing a gas generant charge and having a body and a movable rod extending from said body, and further including a bracket attached to the exterior surface of said inner segment, said body of said pneumatic cylinder being attached to said bracket, the end of said rod remote from said body of said pneumatic cylinder being intermediately pivoted to said lever, and the pivotal attachment of the end of said lever and said first and second links moving into an over center position when said segments are fully deployed in their extended positions whereby to lock said exit cone against thrust forces of the nozzle.

11. An extendible nozzle exit cone for a rocket motor as specified in claim 10 wherein said slotted cam extends longitudinally of said extendible nozzle exit cone and includes an inwardly facing curved surface at its downstream end, and wherein the said cam follower at said one end of said lever and the pivotal connection thereto of the end of said pneumatic cylinder rod are positioned transversely of the length of said lever, whereby upon completion of the stroke of said pneumatic cylinder said cam follower moves into said inwardly facing cam curved surface and said lever is given a rotative movement about said cam follower as a pivot to move the pivotal attachment of the lever and said first and second links to an over center position.

* * * * *